106. COMPOSITIONS, COATING OR PLASTIC.

Patented Aug. 26, 1924.

1,506,193

UNITED STATES PATENT OFFICE.

OTTO K. MILLER, OF OKOLONA, KENTUCKY.

WATERPROOFING COMPOSITION FOR WALLS.

No Drawing.   Application filed October 12, 1923.   Serial No. 668,175.

*To all whom it may concern:*

Be it known that I, OTTO K. MILLER, a citizen of the United States, residing at Okolona, in the county of Jefferson and State of Kentucky, have invented certain new and useful Improvements in Waterproofing Composition for Walls; and I do hereby declare the following to be a full, clear, and exact description of the invention, such as will enable others skilled in the art to which it appertains to make and use the same.

This invention treats of waterproof coatings for walls or the like, and relates an improved covering which may be applied to basement or cellar walls which are particularly liable to become damp, and which, when applied, will render the wall so treated impervious to moisture.

One of the principal objects of this invention is to provide a simple, easily prepared composition which can be readily applied to concrete walls or the like, and which will render the same waterproof against the seeping of moisture therethrough.

Another and further object of this invention is the provision of a waterproofing composition for walls or the like, which can be applied to either a damp or a dry wall, and which will, in either case, render the wall proof against decomposition by moisture, and against the seeping of the same therethrough, and which will consequently keep the space enclosed by such waterproofed wall absolutely dry under all conditions of weather.

Other and further important objects of this invention will be apparent from the description in the following specification.

The invention, in a preferred form, will be hereinafter more fully described and claimed.

The ingredients are as follows:

Plaster of Paris_____ One part.
Wood fibre_____ One part.
Cement _____ Two parts.
Hydrated lime_____ One-half part.

Calcined gypsum in any form may constitute the plaster of Paris, and if an "ivory" or smooth surface is desired for the coating, the same may be painted with any suitable wax or other solution.

The wood fibre should preferably be finely ground, but may be of any desired degree of texture, and also may be replaced by similar materials without departing from the spirit of the invention.

The cement comprises the usual composition of calcined and pulverized limestones, clay sands, and other ingredients, and any good grade of cement may be incorporated in the composition.

The hydrated lime includes ordinary slaked lime of any good quality, and it will further be obvious that the proportions of the ingredients used may be varied if desired or found necessary for any particular use.

The method of use is as follows:

The cement and lime are well mixed together first, then the plaster of Paris added, and the mixture again thoroughly stirred and mixed, finally the wood fibre is added, mixing well before adding water in a quantity sufficient to make the resultant product the consistency of a plaster. This is then applied to the wall to be treated in any convenient manner.

I am aware that many changes may be made, and numerous details of the proportions of the ingredients used, and the method of mixing varied throughout a wide range without departing from the spirit of this invention, and I therefore do not purpose limiting the patent granted hereon otherwise than as necessitated by the prior art.

I claim as my invention:

1. A waterproofing composition for walls including the following ingredients in approximately the following proportions: plaster of Paris, one portion; wood fibre, one portion; cement, two portions; and hydrated lime, one-half portion.

2. A waterproofing composition including calcined gypsum, one part; organic fibre, one part; cement, two parts; and hydrated calcium hydroxide, one-half part.

In testimony whereof I affix my signature.

OTTO K. MILLER.